US007227510B2

(12) United States Patent
Mayer, III et al.

(10) Patent No.: US 7,227,510 B2
(45) Date of Patent: Jun. 5, 2007

(54) METHOD AND APPARATUS FOR SEAMLESS INTEGRATION OF IMAGES USING A TRANSMISSIVE/REFLECTIVE MIRROR

(75) Inventors: Theodore Mayer, III, Valley Village, CA (US); Peter J. Inova, Glendale, CA (US); Todd A. Chaney, Burbank, CA (US); Lawrence S. Paul, Encino, CA (US)

(73) Assignee: Panoram Technologies, Inc., Sun Valley, CA (US)

( * ) Notice: Subject to any disclaimer, the term of this patent is extended or adjusted under 35 U.S.C. 154(b) by 762 days.

(21) Appl. No.: 09/880,516

(22) Filed: Jun. 12, 2001

(65) Prior Publication Data

US 2002/0008675 A1 Jan. 24, 2002

Related U.S. Application Data

(60) Provisional application No. 60/211,814, filed on Jun. 14, 2000.

(51) Int. Cl.
*G09G 5/00* (2006.01)
*G03B 21/26* (2006.01)

(52) U.S. Cl. .............................. 345/1.1; 345/9; 353/30; 348/744

(58) Field of Classification Search .................. 345/1.1, 345/7, 9; 348/744, 745, 749, 750; 353/30, 353/31
See application file for complete search history.

(56) References Cited

U.S. PATENT DOCUMENTS 3,659,920 A   5/1972 McGlasson
4,575,722 A * 3/1986 Anderson .................... 345/86
4,671,625 A   6/1987 Noble ......................... 350/452
4,859,031 A   8/1989 Berman et al. .............. 350/174
4,866,530 A   9/1989 Kalua
4,974,073 A  11/1990 Inova
5,011,277 A   4/1991 Ogino et al.
5,028,994 A * 7/1991 Miyakawa et al. ........... 348/49
5,136,390 A   8/1992 Inova et al.
5,144,459 A   9/1992 Felske et al. ................. 359/13
5,257,130 A  10/1993 Monroe ....................... 359/478
5,311,357 A   5/1994 Summer et al. ............. 359/479

(Continued)

FOREIGN PATENT DOCUMENTS

| JP | 5-241098 | 9/1993 |
| JP | 9-34378 | 2/1997 |
| JP | 9-037305 | 2/1997 |
| JP | 9-054375 | 2/1997 |
| JP | 2001-091897 | 4/2001 |

OTHER PUBLICATIONS

International Search Report dated Oct. 24, 2001 from PCT Application No. PCT/US01/18967.
Supplementary European Search Report of EP 01946305.8, Jul. 1, 2005.
Canadian Office Action dated Apr. 5, 2005 for Application No. 2,412,319 in the name of Panoram Technologies, Inc.

*Primary Examiner*—Richard Hjerpe
*Assistant Examiner*—M. Fatahiyar
(74) *Attorney, Agent, or Firm*—Christie, Parker & Hale, LLP

(57) ABSTRACT

An integrated display system includes multiple displays and a transmissive/reflective mirror with a mirror face. Images from display areas of one or more displays are passed through the mirror face and provided to a viewer. Images from display areas of one or more displays are reflected by the mirror face and provided to the viewer. The displays are arrayed to generate a seamless composite image from the images provided by the displays.

35 Claims, 14 Drawing Sheets

U.S. PATENT DOCUMENTS

| | | | |
|---|---|---|---|
| 5,361,078 A | 11/1994 | Caine | 345/1 |
| 5,367,399 A | 11/1994 | Kramer | 359/206 |
| 5,486,878 A | 1/1996 | Negishi et al. | |
| 5,537,251 A | 7/1996 | Shimada | |
| 5,717,518 A | 2/1998 | Shafer et al. | 359/357 |
| 5,726,800 A | 3/1998 | Ezra et al. | |
| 5,748,382 A | 5/1998 | Maguire, Jr. | 359/676 |
| 5,771,072 A | 6/1998 | Tokoro et al. | 348/383 |
| 5,782,547 A | 7/1998 | Machtig et al. | 353/28 |
| 5,805,120 A | 9/1998 | Yamada et al. | 345/7 |
| 5,828,410 A | 10/1998 | Drapeau | 348/383 |
| 5,856,811 A | 1/1999 | Shih et al. | 345/8 |
| 5,886,822 A | 3/1999 | Spitzer | 359/630 |
| 5,926,308 A | 7/1999 | Lee et al. | 359/237 |
| 6,008,939 A | 12/1999 | Hebert | 359/475 |
| 6,017,123 A | 1/2000 | Bleha et al. | |
| 6,040,946 A | 3/2000 | Hebert | 359/630 |
| 6,042,235 A | 3/2000 | Machtig et al. | 353/28 |
| 6,046,787 A | 4/2000 | Nishiguchi | |
| 6,097,543 A | 8/2000 | Rallison et al. | 359/633 |
| 6,115,022 A | 9/2000 | Mayer, III et al. | |
| 6,222,593 B1 * | 4/2001 | Higurashi et al. | 348/745 |
| 6,247,815 B1 * | 6/2001 | Inova | 353/30 |
| 6,254,239 B1 * | 7/2001 | Hibner et al. | 353/94 |
| 6,280,037 B1 * | 8/2001 | Smith | 353/31 |

\* cited by examiner

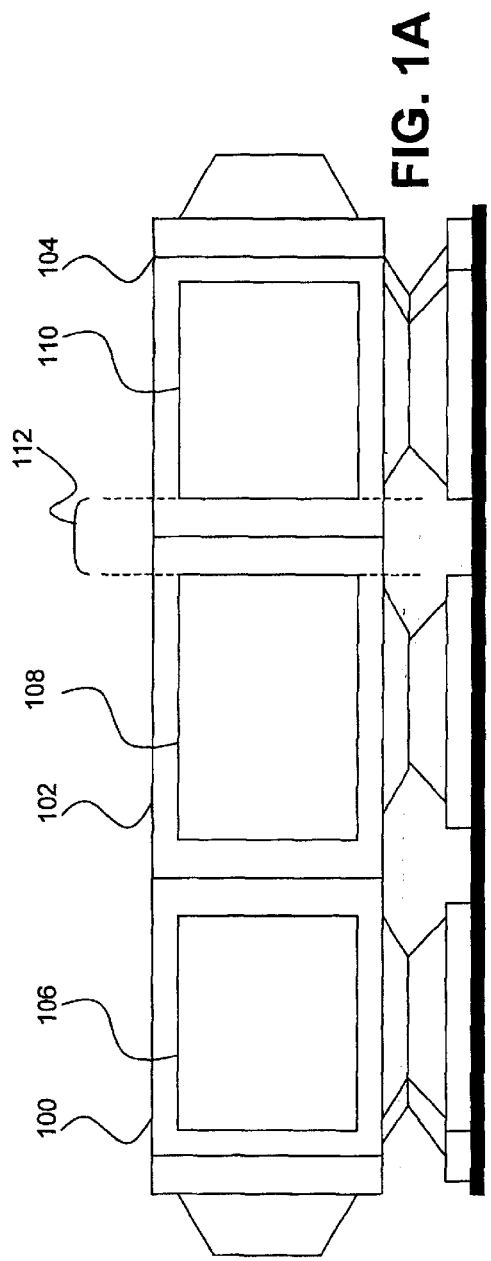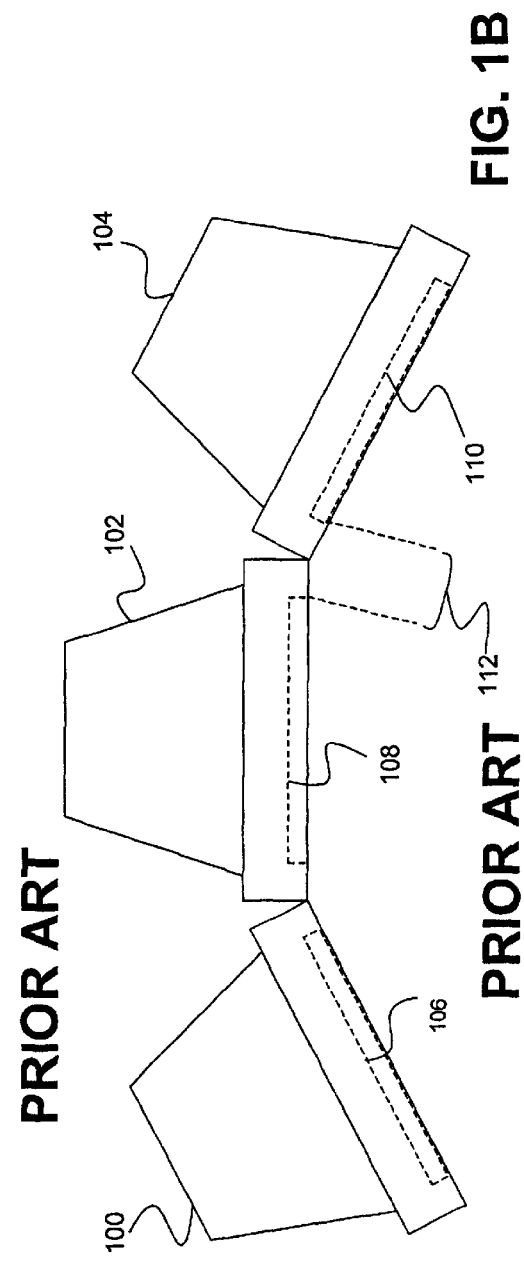

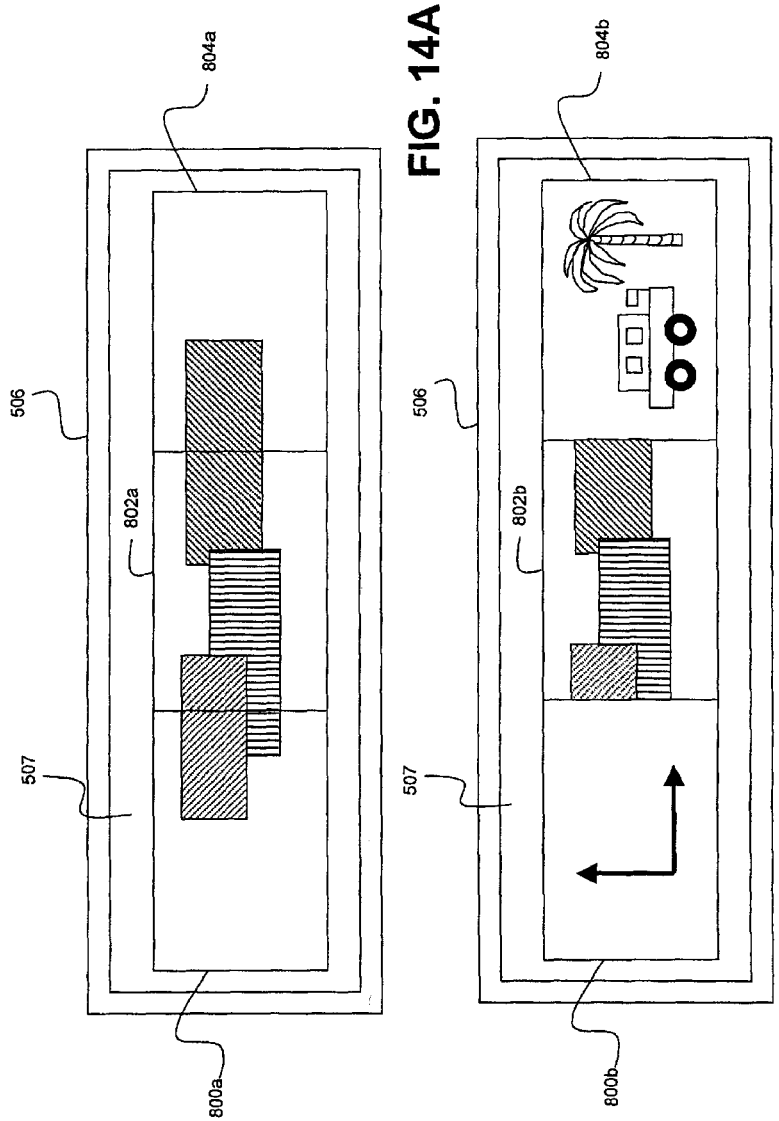

METHOD AND APPARATUS FOR SEAMLESS INTEGRATION OF IMAGES USING A TRANSMISSIVE/REFLECTIVE MIRROR

CROSS-REFERENCE TO RELATED APPLICATION(S)

The present application claims the priority of U.S. Provisional Application No. 60/211,814 entitled "Method and Apparatus for Seamless Integration of Images Using a Transmissive/Reflective Mirror" filed Jun. 14, 2000, the contents of which are fully incorporated by reference herein. Further, the present application contains subject matter related to the subject matter disclosed in U.S. patent application Ser. No. 09/591,555 entitled "Multi-Panel Video Display" filed Jun. 8, 2000, the contents of which are fully incorporated by reference herein.

FIELD OF THE INVENTION

The present invention is related to display of a composite image using multiple image sources, and particularly to method and apparatus for seamless integration of images using a transmissive/reflective mirror.

BACKGROUND OF THE INVENTION

Computer users often desire to view video or graphic images that exceed the viewable area of a single monitor. For example, designers of large systems often use computer aided design (CAD) tools to generate designs. Many times, these designs are too detailed or too large to fully display on a single monitor with the desired high enough resolution. In addition, users often display multiple computer windows simultaneously. The multiple windows typically overlay and block one another since the viewable area of a monitor is generally not large enough to accommodate more than a few computer windows at the same time.

A typical home computer user may become frustrated by the crowding of the desktop screen by multiple computer windows. A professional computer user, e.g., a graphic artist or a CAD designer, in addition, may suffer from inefficiency or low productivity associated with being able to view only a portion of a large image or having to stack and re-stack multiple computer windows.

From an entertainment standpoint, the industry has always sought bigger, brighter, higher quality, more involving display technologies with continuous improvements, for example, from black and white to color, from color television to HDTV, and from 35 mm film to Imax.

A larger viewable area, i.e., larger screen real estate, and higher resolution, i.e., more pixels, is thus always desirable and very useful, whether for laying out and viewing a larger portion of video or graphic images at the same time or simply for more involvement in the content. Therefore, it is often desirable to display video or graphic images on a viewable area that is bigger than what is typically available on a single monitor. Arrayed display systems have been used to create a viewable area that is taller and/or wider than what is normally available on a single monitor. A typical arrayed display system includes two or more video display devices that are horizontally and/or vertically adjacent to one another.

An important character is the adjacency or the apparent seamlessness of the transition between image segments. If the adjacent segments are too far apart, the users tend to segregate their use of the system by screen segments, thus dramatically reducing the potential usefulness of the larger work surface. Thus, a highly desirable quality of an arrayed display system is the minimization of apparent segregation between the array segments.

One method of diminishing this segregation is embodied in multi-projector based display systems. These systems typically include two or more video projectors that are arrayed in an overlapping adjacent format with each projector being fed by one channel of a visual computer or other video source. The result generally includes a composite image that combines the additive size, the additive brightness and the additive resolution of the multiple channel sources and the multiple projectors.

An example of this projection technology is described in U.S. Pat. No. 4,974,073 entitled "Seamless Video Display," U.S. Pat. No. 5,136,390 entitled "Adjustable Multiple Image Display Smoothing Method and Apparatus," and U.S. Pat. No. 6,115,022 entitled "Method and Apparatus for Adjusting Multiple Projected Raster Images," the contents of all of which are fully incorporated by reference herein.

The use of projector-based display systems may provide a larger viewable area and higher resolution than a single monitor or a display device. However, projector-based display systems are not always suited for widespread use by individuals since the current systems can be expensive, large and technically complex.

Multiple conventional computer monitors or flat panel displays may be placed side by side to provide a type of arrayed display system. However, due to the packaging of most standard CRTs and other monitors, such a configuration typically results in wider than acceptable image segregation, also referred to as a mullion, between the displays. This prevents the displays from having an integrated look as illustrated in FIGS. 1A, 1B and 2.

FIG. 1A illustrates three conventional monitors 100, 102 and 104 placed side-by-side in an array. FIG. 1B is a top view of the three arrayed monitors 100, 102 and 104 of FIG. 1A. The monitors 100, 102 and 104 have viewable areas 106, 108 and 110, respectively. The viewable areas are smaller than the front surface of the monitors because of the respective housings. A relatively wide gap or mullion, e.g., gap 112 between the viewable areas 108 and 110 of the adjacent monitors 102 and 104, exists between adjacent viewable areas.

FIG. 2 illustrates a distracting effect of the mullions between the viewable areas when the three monitors 100, 102 and 104 are used to display a single composite image. The composite image displays the enlarged text "TEST" across all three of the monitors. As shown in the figure, the first T is displayed on monitors 100 and 102 while the second T is displayed on monitors 102 and 104. The relatively large mullions may distract viewers from viewing the text as a single integrated image.

Therefore, there is a need for an arrayed display system that is capable of providing reduced separation between portions of a composite image in adjacent displays as to reduce viewer distraction. The arrayed display system preferably is affordable to a wider range of users and designed to address ergonomic considerations for providing viewer comfort.

SUMMARY OF THE INVENTION

In one embodiment according to the present invention, an integrated display system is provided. The integrated display system comprises a first display, a second display and a transmissive/reflective mirror. The first display has a display area that faces a user. The second display has the display area that faces a generally vertical direction. The transmissive/reflective mirror has a mirror face between the first display and the user. Images from the first display at least partially pass through the mirror face towards the user, and images from the second display are at least partially reflected by the mirror face towards the user, so as to present a composite image comprising the images from the displays to the user.

In another embodiment according to the present invention, is a method of generating a composite image using a transmissive/reflective mirror. A first image is projected towards a user through the transmissive/reflective mirror. A second image is applied at the transmissive/reflective mirror for the second image to be reflected towards the user. The first image and the second image are slightly overlapped and can be soft edge blended like projected images so that the images appear as a seamless composite image to the user.

In yet another embodiment according to the present invention, is a method of generating a composite image using a transmissive/reflective mirror while applying imaging devices small enough to be carried or worn by the user where a first image is seen directly by the user through the mirror and the second image is seen by the user as a reflected image as described in FIG. 7. The first image and the second image appear as a composite image to the user.

In still another embodiment according to the present invention, is a method of generating a composite image using a transmissive/reflective mirror while applying imaging devices small enough to be carried or worn by the user where a first image is seen directly by the user through the mirror and the second image is seen by the user as a reflected image as described in FIG. 7. The first image and the second image are slightly overlapped and can be soft edge blended like projected images so that the images appear as a seamless composite image to the user.

BRIEF DESCRIPTION OF THE DRAWINGS

FIG. 1A is an illustration of three conventional monitors placed next to one another in an exemplary prior art configuration;

FIG. 1B is a top view of the three conventional monitors of FIG. 1A;

FIG. 14A is a front view of an integrated display system in an embodiment according to the present invention, in which a composite image is displayed across display areas of three monitors; and FIG. 14B is a front view of an integrated display system in an embodiment according to the present invention, in which separate images are displayed on each of display areas of three monitors.

DETAILED DESCRIPTION

Figure 2:
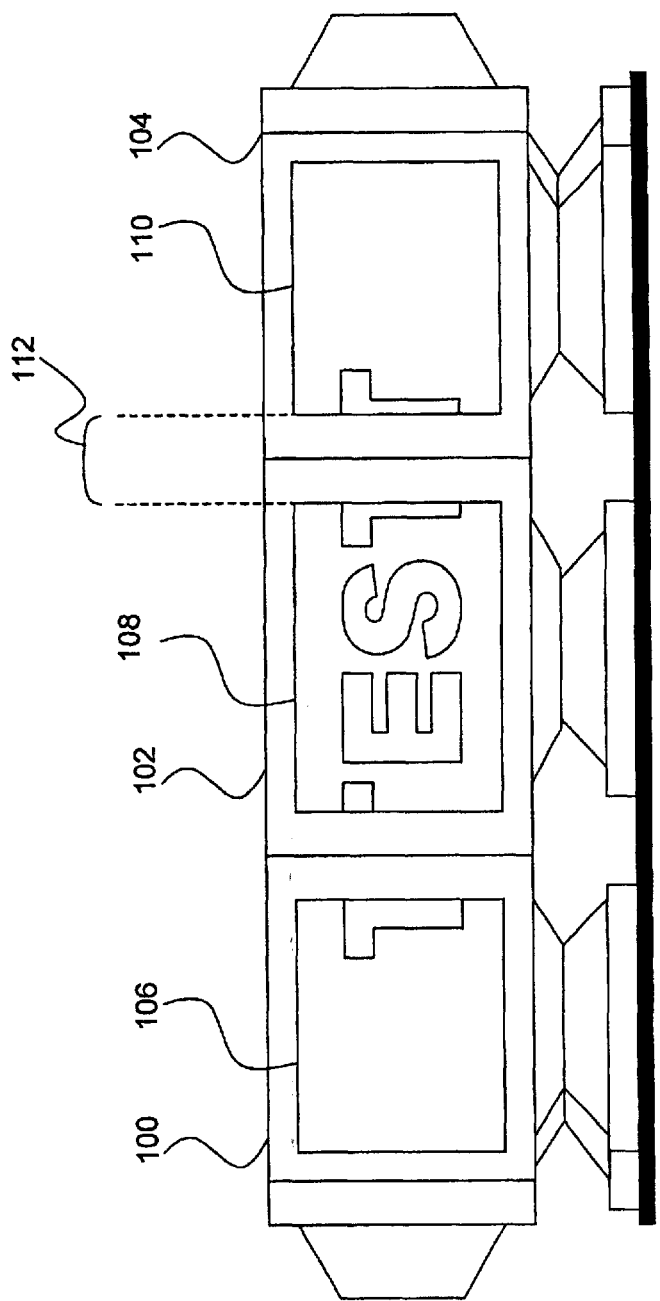
FIG. 2 is an illustration of a display of a composite image across three adjacent conventional monitors arranged in a prior art configuration.
Figure 3A:
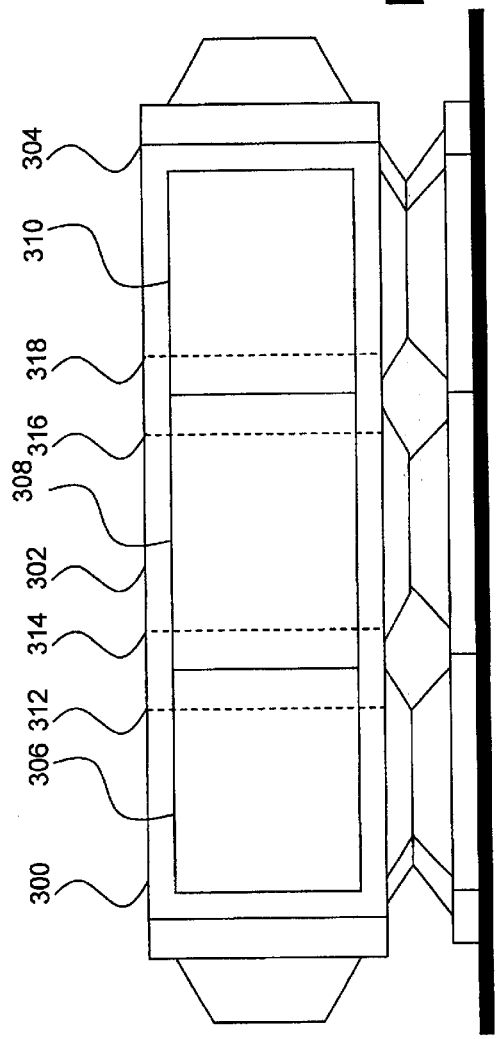
FIG. 3A is an illustration of three adjacent conventional monitors in a physically impossible configuration to show the display areas touching one another.
Figure 3B:
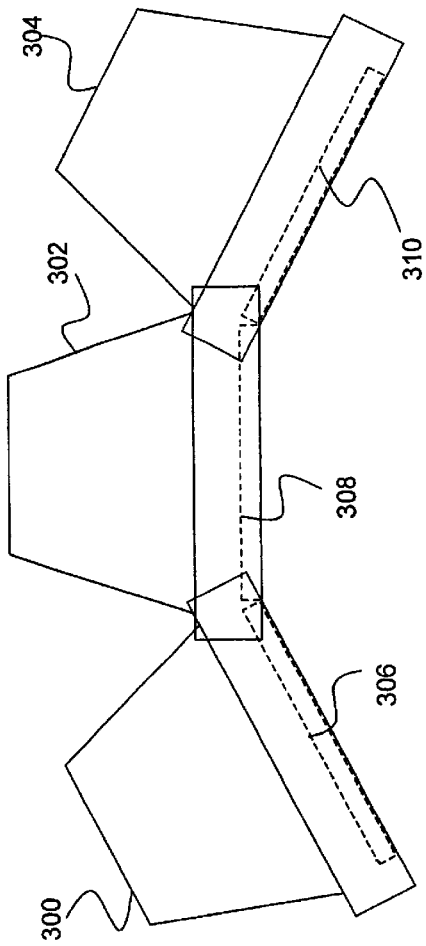
FIG. 3B is a top view of the three adjacent conventional monitors in a physically impossible configuration of FIG. 3A.

FIG. 3A is a physically impossible configuration of three adjacent monitors 300, 302 and 304 shown for illustrative purposes only. FIG. 3B is a top view of the three adjacent monitors 300, 302 and 304 of FIG. 3A in physically impossible configuration. Display areas 306, 308 and 310 of the monitors 300, 302 and 304 are illustrated to be touching one another. This configuration is physically impossible because of the packaging surrounding the display areas, e.g., cathode ray tube (CRT) of the monitors or the flat panels. For example, FIG. 3A illustrates that a left edge 312 of the monitor 302 is located within the monitor 300, a right edge 314 of the monitor 300 is located within the monitor 302, a left edge 316 of the monitor 304 is located within the monitor 302 and a right edge 318 of the monitor 302 is located within the monitor 304.

Figure 4:
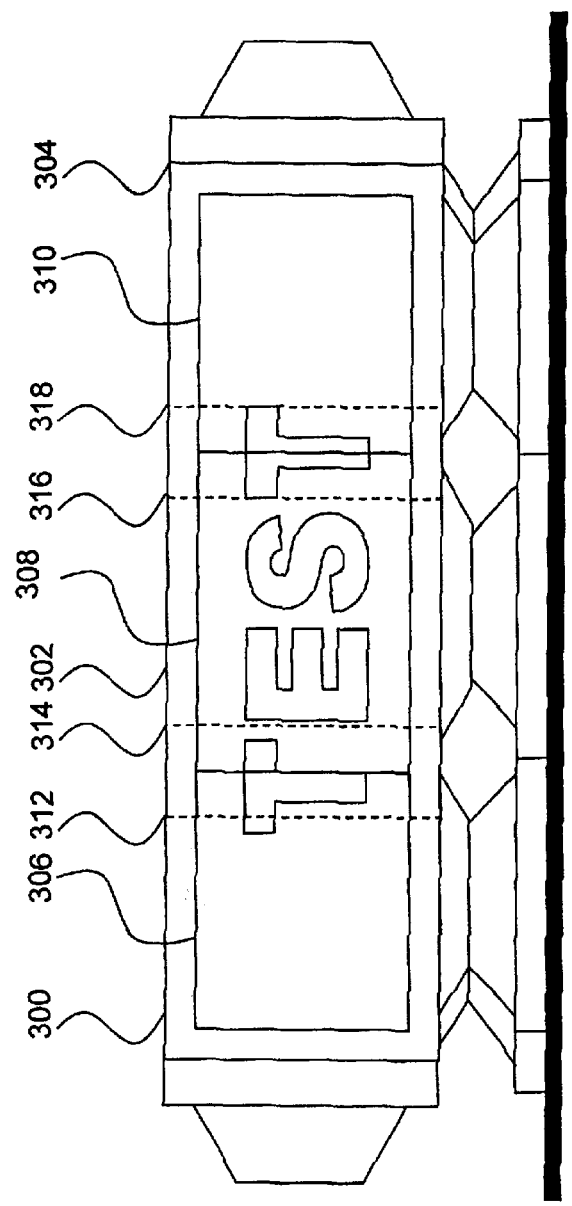
FIG. 4 is an illustration of a display of a composite image across the three conventional monitors in a physically impossible configuration of FIG. 3A.

FIG. 4 is an illustration of a composite image "TEST" being displayed on three adjacent monitors 300, 302 and 304 of FIG. 3A, which is illustrated to be in a physically impossible configuration. A portion of the first "T" appears on a display area 306 of the monitor 300 while another portion of the first "T" appears on a display area 308 of the monitor 302. Due to the display areas, which may also be referred to as viewable areas, being adjacent to one another, there is virtually no separation between two portions of the first "T", and it is relatively non-distracting. This also applies to two portions of the second "T", which appears on display areas 308 and 310 of the monitors 302 and 304, respectively.

Figure 5:
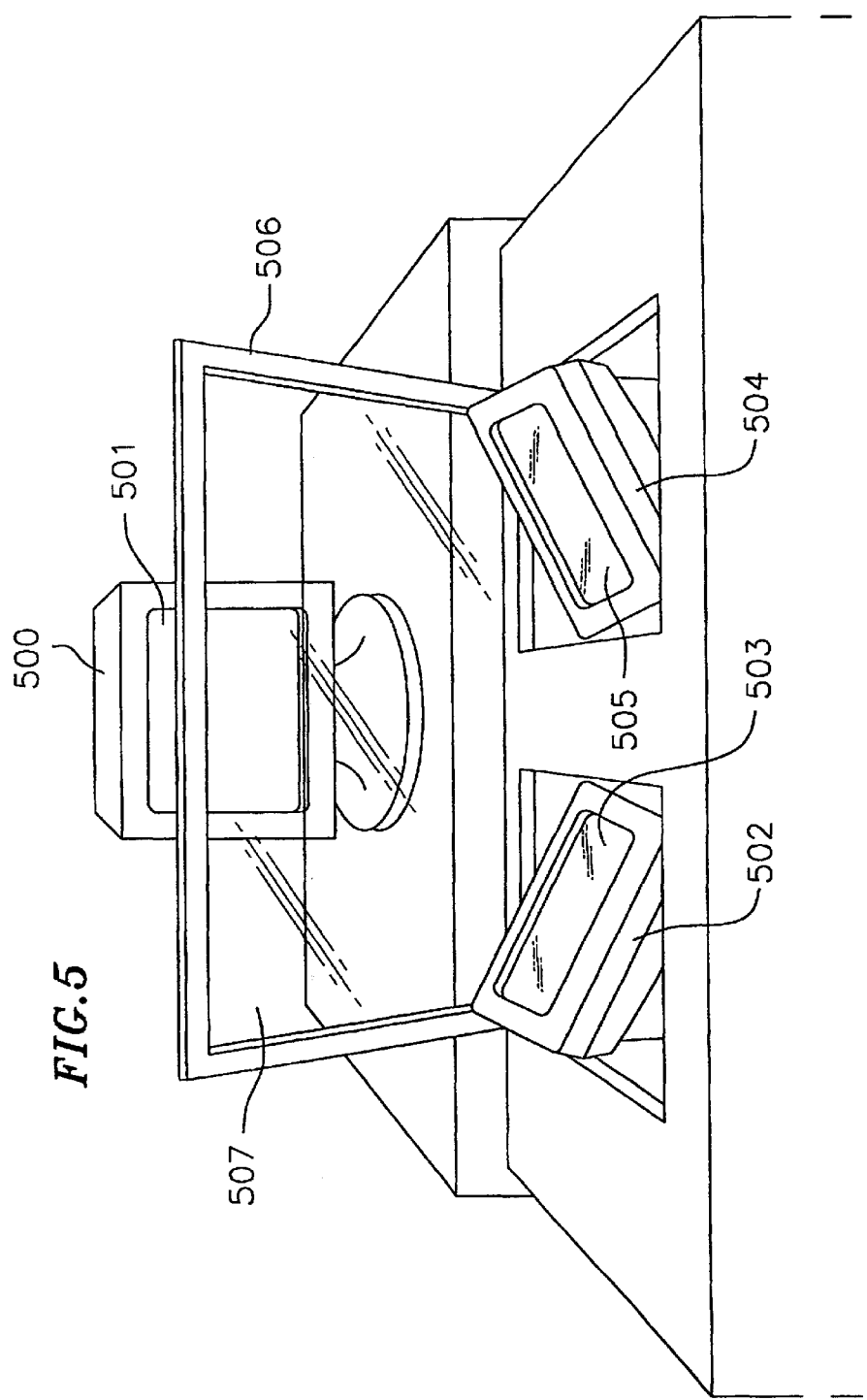
FIG. 5 is a front view of an integrated display system including three monitors and one transmissive/reflective mirror according to an embodiment of the present invention.
Figure 6:
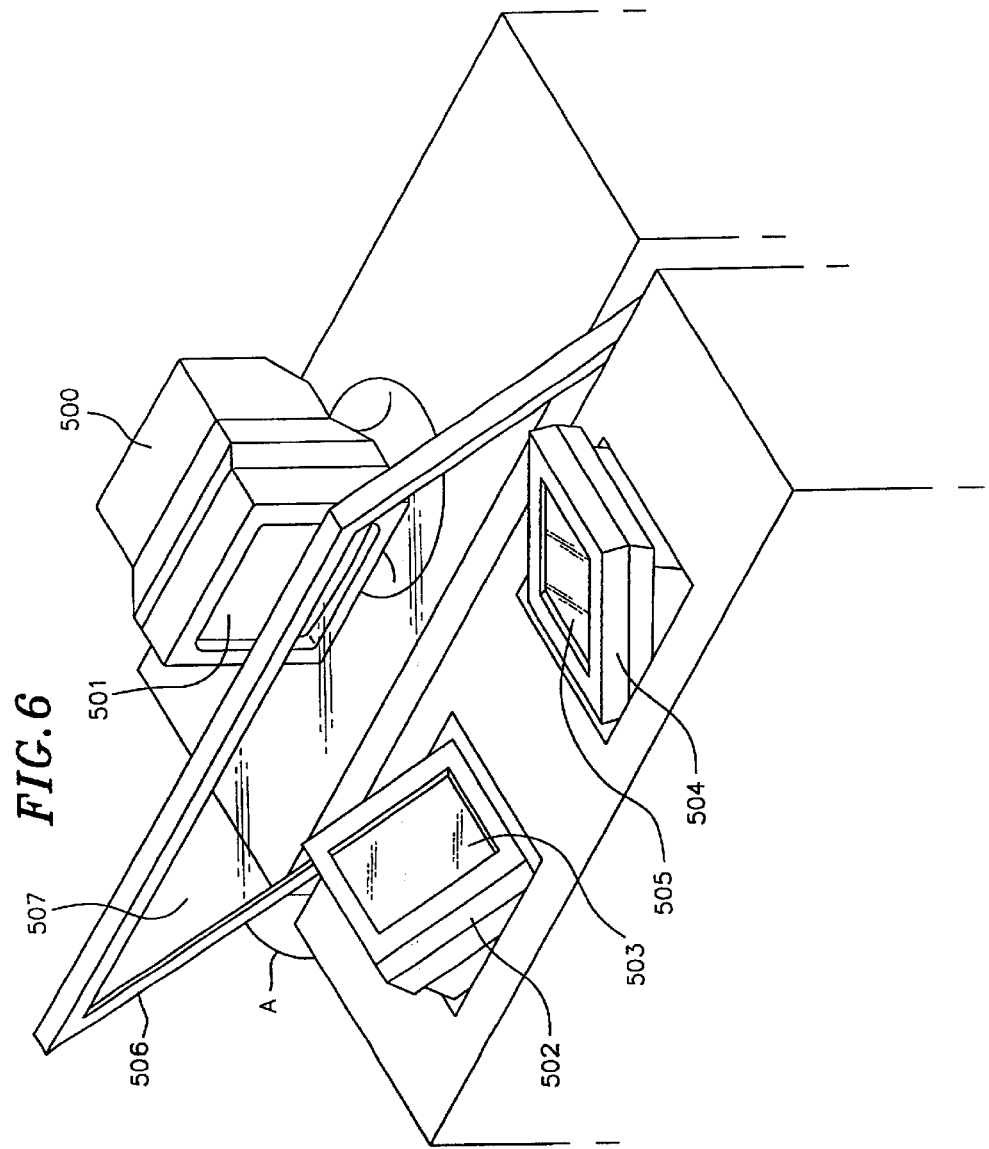
FIG. 6 is a view at an angle of the integrated display system of FIG. 5.

FIG. 5 is a front view of an integrated display system including three monitors (or displays) 500, 502, 504 and one transmissive/reflective mirror 506 in an embodiment according to the present invention. The integrated display system may also be referred to as an integrated monitor system. FIG. 6 is a view at an angle of the integrated display system of FIG. 5. In the described embodiment, the monitors 500, 502 and 504 may include a cathode ray tube (CRT). In other embodiments, the monitors 500, 502 and 504 may be based on other technologies, such as other technologies that provide sufficient luminance after applying the transmissive/reflective mirror 506. The monitors 500, 502 and 504 preferably have substantially flat display areas, i.e., flat panels or screens, in one embodiment of the present invention. In other embodiments, the monitors 500, 502 and 504 may have non-flat display areas.

The monitor 500 preferably is oriented to have its display area 501 substantially normal to ground and facing a user (a viewer). In other embodiments, the monitor 500 may have its display area 501 tilted forward towards the user or backward away from the user.

The monitors 502 and 504 have display areas 503 and 505, respectively. The display areas 503 and 505 preferably face a generally upward direction. In the described embodiment, the monitors 502 and 504 are oriented such that the display areas 503 and 505 are angled in a direction towards facing one another. The display areas 503 and 505 may have an angle of, for example, 20 degrees, with respect to one another.

In other embodiments, the angle between the display areas 503 and 505 and ground may be more or less than 20 degrees or even angling outward, or the display areas 503 and 505 may not be angled and may face a substantially straightly upward direction. For example, by angling the two edge monitors in a three monitor system, all three monitors may be seen as being equidistant to the viewer, which is desirable for ergonomic reasons similar to one embodiment of the invention disclosed in U.S. patent application Ser. No. 09/591,555 entitled "Multi-Panel Video Display," the contents of which have been fully incorporated by reference herein. For another example, when more monitors (e.g., five monitors) are used, by arraying the monitors with angles, an illusion of a miniature curved screen may be presented to the viewer.

The transmissive/reflective mirror 506, which may also be referred to as a beam splitter, preferably includes a 50/50 transmissive/reflective mirror, which passes through approximately 50% of the incident light and reflects approximately 50% of the incident light.

In other embodiments, the ratio between the amount of transmitted light and the amount of reflected light may be more or less than 1. The transmissive/reflective mirror 506 preferably has a mirror face 507, which may also be referred to as a face of the mirror. The mirror face 507 preferably is at approximately 45 degree angle (angle A of FIG. 6) with respect to ground, extending upward towards the monitors 502 and 504. In other embodiments, the angle the mirror face 507 makes with respect to ground may be more or less than 45 degrees.

Since the transmissive/reflective mirror 506 is between the display area 501 and the user, the user typically views images on the display area 501 through the mirror face 507. At least a portion of light from the display area 501 typically does not pass through the mirror face 507, and thus brightness of the images from the display area 501 is generally reduced when viewed by the user through the mirror face 507. The ratio between the passed-through and non-passed-through portions of light depends on the transmissive/reflective characteristics of the mirror face used.

Since the display areas 503 and 505 face generally upward direction towards the mirror face 507, the user typically views reflections of the images from the display areas 503 and 505 formed on the mirror face 507. At least a portion of light from the display areas 503 and 505 typically passes through the mirror face 507, and thus brightness of the images from the display areas 503 and 505 are generally reduced when viewed by the user as reflections on the mirror face 507. The ratio between the passed-through and non-passed-through portions of light depends on the transmissive/reflective characteristics of the mirror face used.

The monitors 502 and 504 preferably are oriented so that the top of images on the display areas 503 and 505, respectively, are closer to a user than the bottom of the images on the display areas 503 and 505. Thus, when the images from the display areas 503 and 505 are reflected by the mirror face 507, the top of the images appears near the top of the mirror face 507 and the bottom of the images appears near the bottom of the mirror face 507. Similar to typical reflections, the images from the display areas 503 and 505 are generally horizontally reversed when reflected on the mirror face 507, and a left edge of each image typically appears as a right edge of a corresponding reflected image, and vice versa.

Figure 7:
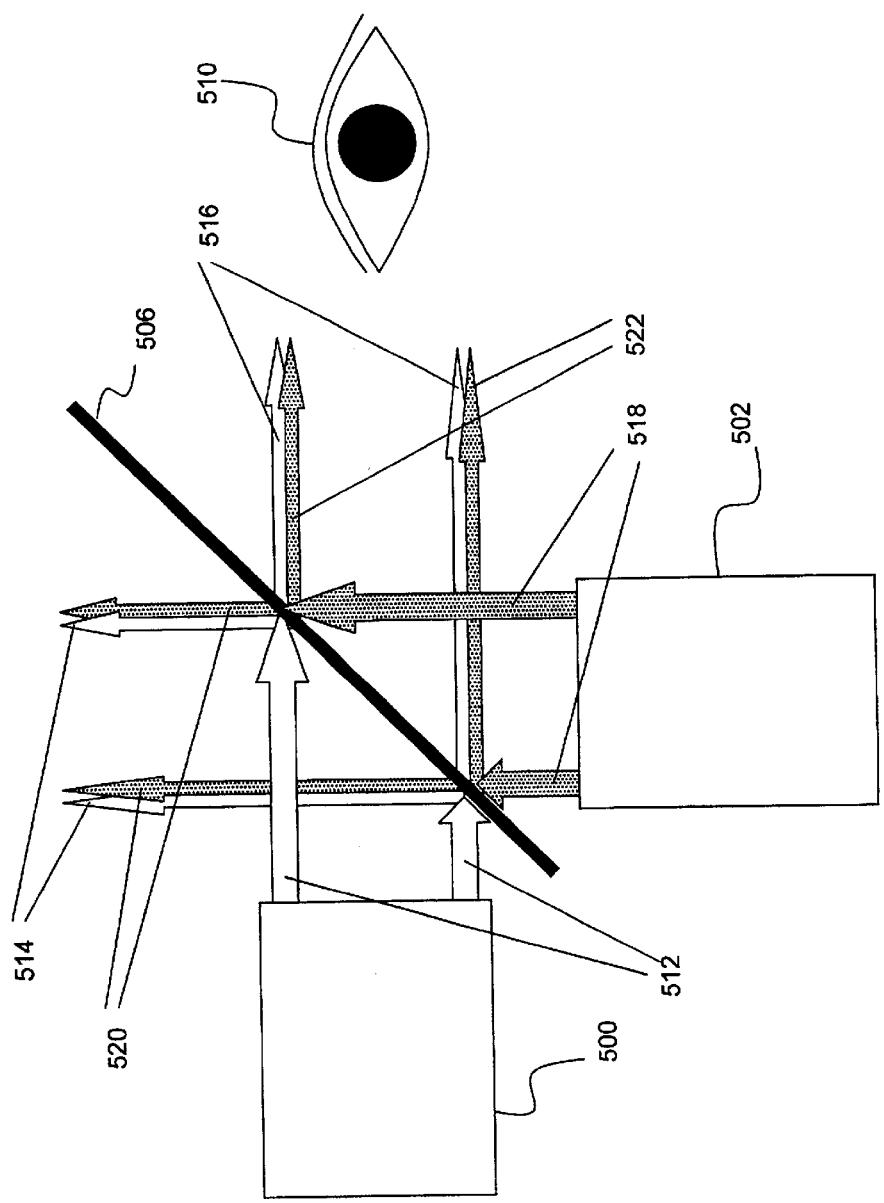
FIG. 7 illustrates optical path from the monitors to the viewer of the integrated display system of FIGS. 5 and 6.

FIG. 7, for example, illustrates optical path between the image sources and a viewer eye 510 in this embodiment. For illustrative purposes, only one monitor 500 is facing the viewer and only one monitor 502 is facing generally upward direction in FIG. 7. However, it should be noted that any number of monitors may face the viewer and any number of monitors may be facing generally upward direction to create the composite image with any desired size in various different embodiments of the present invention.

A light output 512 from the monitor 500 is applied to the face of the transmissive/reflective mirror 506. A light component 516 passes through the mirror to be viewed by the viewer while a light component 514 is reflected by the mirror 506 away from the viewer eye 510.

A light output 518 from the monitor 502 is applied to the face of the transmissive/reflective mirror 506. A light component 522 is reflected by the mirror to be viewed by the viewer while a light component 520 passes through the mirror 506 in a direction away from the viewer eye 510.

In an exemplary embodiment, the integrated display system may be placed inside a light controlled cabinet, and the transmissive/reflective mirror 506 preferably creates the appearance of a virtual image plane in which the images appear as a single composite image. The three images preferably appear to be edge matched to one another, creating a seamless (virtual) composite image. The images may appear to be at an angle with respect to one another. For example, when the angle between ground and each of display areas 503 and 505 is approximately 20 degrees, the images may appear to be at an angle of approximately 20 degrees with respect to one another.

The integrated display system may also be coupled to a control unit (not shown) for providing inputs and power to the monitors 500, 502, 504, and for controlling the displays on the monitors. The control unit may be used to control display characteristics of all three of the monitors. In other embodiments, a separate control unit may be used to control display for each monitor. The integrated display system may include a control software for display configuration and maintenance. The control software may be commanded to perform control functions from the control unit or any other external device such as an external computer. The control software may be controlled by using an input device such as a keyboard and/or mouse.

The signals feeding the integrated display system may also be passed through an external signal processing device (not shown) in order to modify each signal relative to the other to create a more uniform, geometrically correct and seamless image. The signal processing may include modification of the images (such as with distortion correction circuitry) in order to correct aberration due to mechanical and/or optical misalignment. This correction preferably performs geometric distortion correction to tune the flaws of the monitors in order to perfectly align the images either for overlap or for adjacency.

The signal processing may also include modification of the images in order to correct image non-uniformity which may include, but not limited to, hot spotting and/or color balancing such as, for example, disclosed in U.S. Pat. No. 6,115,022. Further, the signal processing may also include edge blending, such as, for example, disclosed in U.S. Pat. Nos. 4,974,073 and 5,136,390, in an embodiment where the images are overlapped.

In combination, the signal processing may be used to control display characteristics of all three of the monitors. In other embodiments, signal processing capabilities may be built into each monitor or into the multi-monitor system. The signal processing capabilities may be implemented using a control software for display configuration and adjustment of parameters. The control software may be commanded to perform control functions from the control unit or any other device such as an external computer. The control software may be controlled by using an input device such as a keyboard and/or mouse or an automated feedback system.

In an exemplary embodiment, the integrated display system may include a port (not shown), such as a universal serial bus (USB) port, an RS-232 port, or any other conventional or non-conventional serial or control port, for communication with an external device such as a computer. The port may be used to perform control functions. The port input and the control software preferably allows for external control of characteristics including but not limited to: screen input selection, automatic input calibration and three screen interactive color adjustments. A full setup configuration may be stored and be easily accessible and selectable, by, e.g., screen menu selection, a button selection or clicking a mouse button.

The monitors may include liquid crystal display (LCD) monitors or they may include any other commonly or not commonly used monitors such as, for example, plasma display monitors, or they can include new technologies such as E-ink, organic liquid crystals or organic transistors. The monitor input signals may be analog such as composite video or red, blue, green, sync, or the inputs may be digital such as Digital Visual Interface (DVI) or the inputs could be optical or other technologies not yet directly anticipated.

The integrated display system in an embodiment according to the present invention is capable of selecting from multiple inputs including but not limited to: a main and auxiliary RGB signals for each of the three monitors, composite video signals and/or S-video (Y/C). These inputs allow for use of other devices in addition to a main multi-channel visual computer. Other devices that may provide inputs to the integrated display system may include laptops, VCR, DVD, video conferencing equipment, cable television set top box, as well as closed circuit television and satellite feeds. The user may then be able to select the input feeds or preset combinations of feeds. The integrated display system may also include audio inputs and be coupled to speakers for audiovisual communications.

Figure 8:
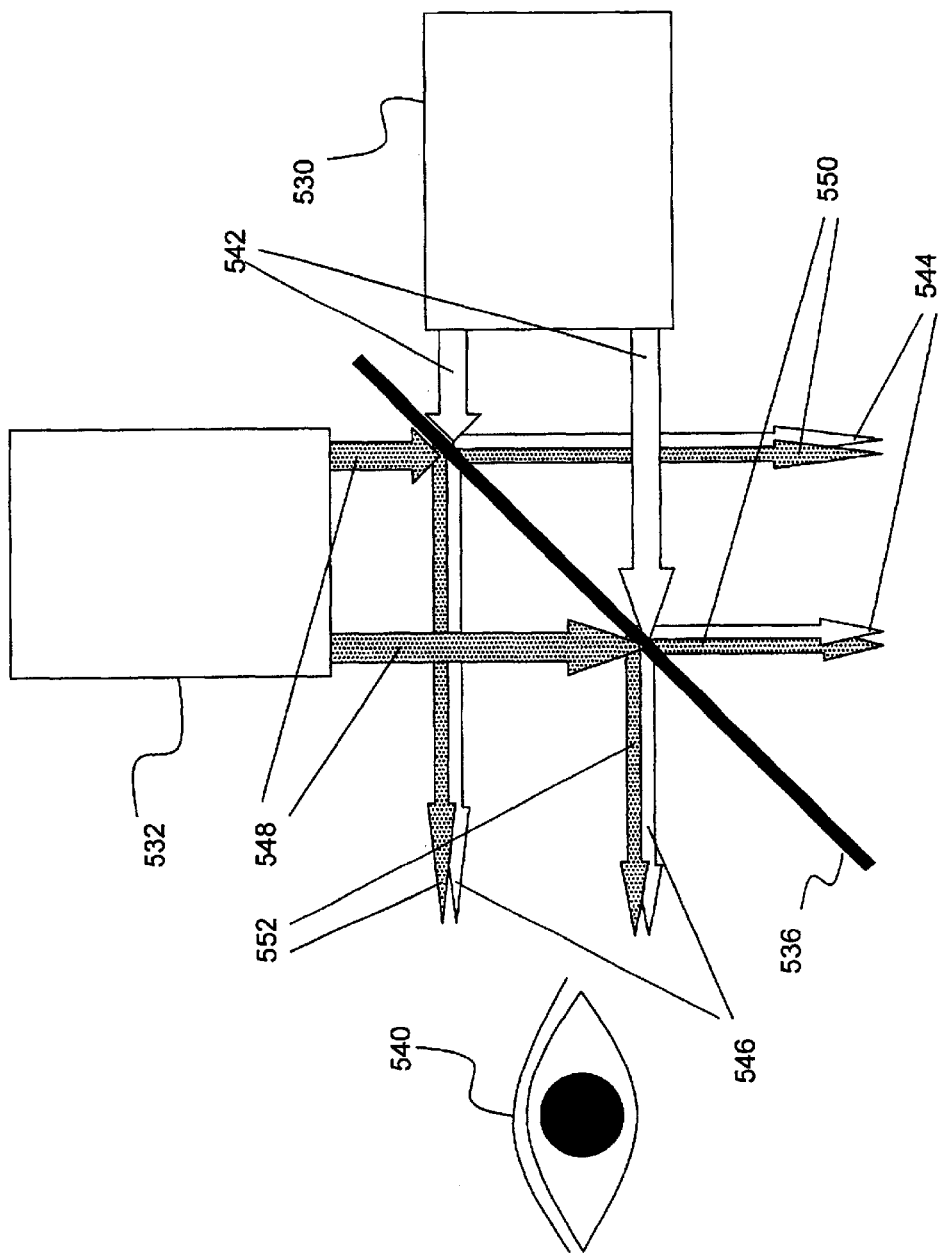
FIG. 8 illustrates optical path from the monitors to the viewer of an integrated display system in another embodiment according to the present invention.

FIG. 8 illustrates optical path between image sources (monitors) 530, 532 and a viewer eye 540 in another embodiment according to the present invention. FIG. 8 is similar to FIG. 7 but the reflected image is coming from above from the monitor 532 facing downward towards a transmissive/reflective mirror 536 as opposed to from the bottom with a monitor facing upward. Of course, in this embodiment as well, multiple monitors may face downward towards the transmissive/reflective mirror 536 and/or multiple monitors may face the viewer through the transmissive/reflective mirror 536.

Figure 9:
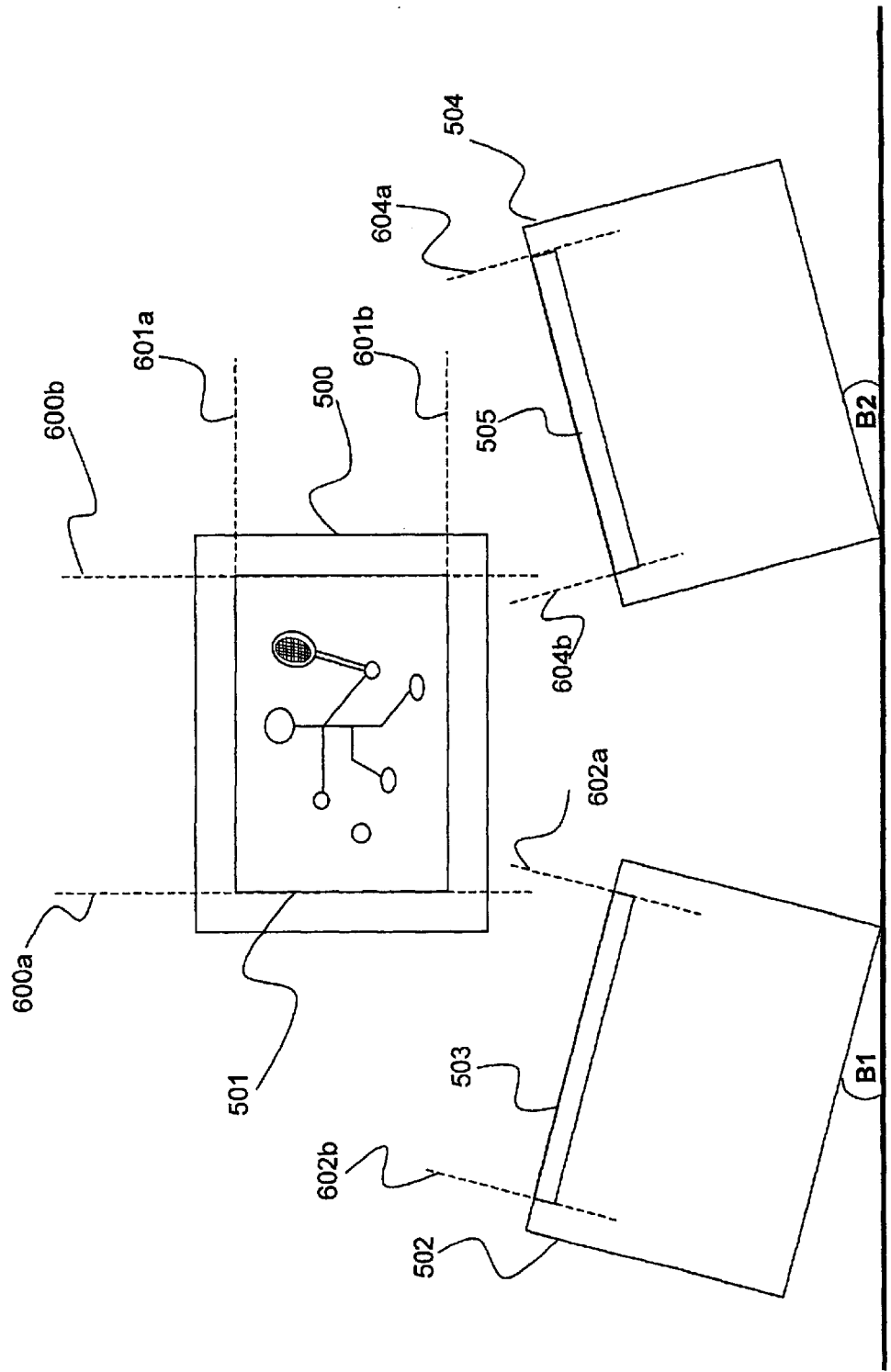
FIG. 9 illustrates a front view of an integrated display system showing spatial relationship between the three monitors in an embodiment according to the present invention without showing the transmissive/reflective mirror.
Figure 10:
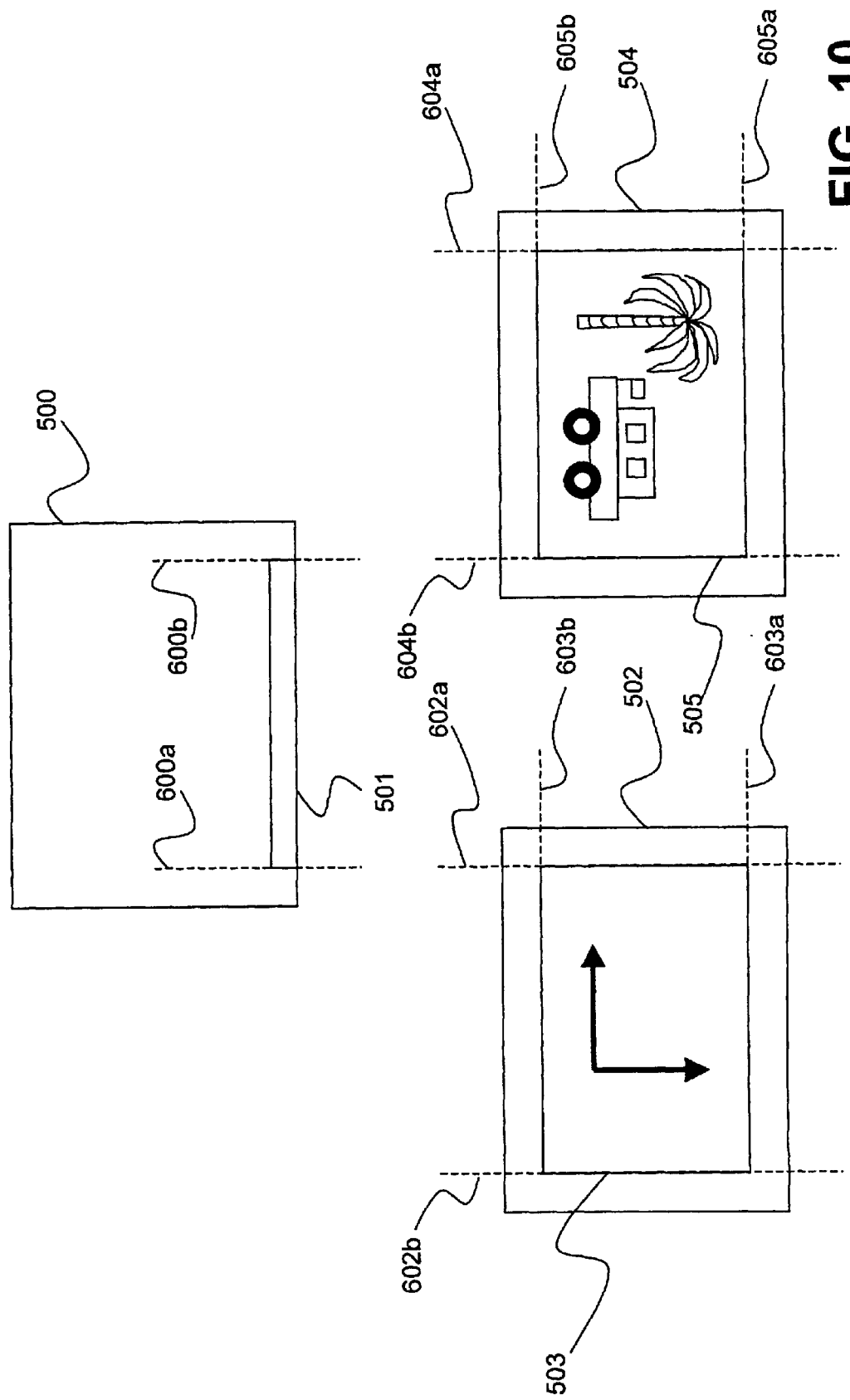
FIG. 10 is a top view of an integrated display system showing spatial relationship between the three monitors in an embodiment according to the present invention without showing the transmissive/reflective mirror.

FIG. 9 is a front view of an integrated display system in an embodiment according to the present invention, including three monitors 500, 502 and 504, illustrating spatial relationship between the monitors without showing a transmissive/reflective mirror. Angles B1 and B2 between ground and display areas (display surfaces) 503 and 505 of the monitors 502 and 504, respectively, are approximately 20 degrees in this embodiment. In other embodiments, the angles B1 and B2 may be more or less than approximately 20 degrees. In still other embodiments, the angles B1 and B2 may be approximately zero degrees and the display areas 503 and 505 may be substantially parallel to ground. FIG. 10 is a top view of the integrated display system of FIG. 9.

Figure 11:
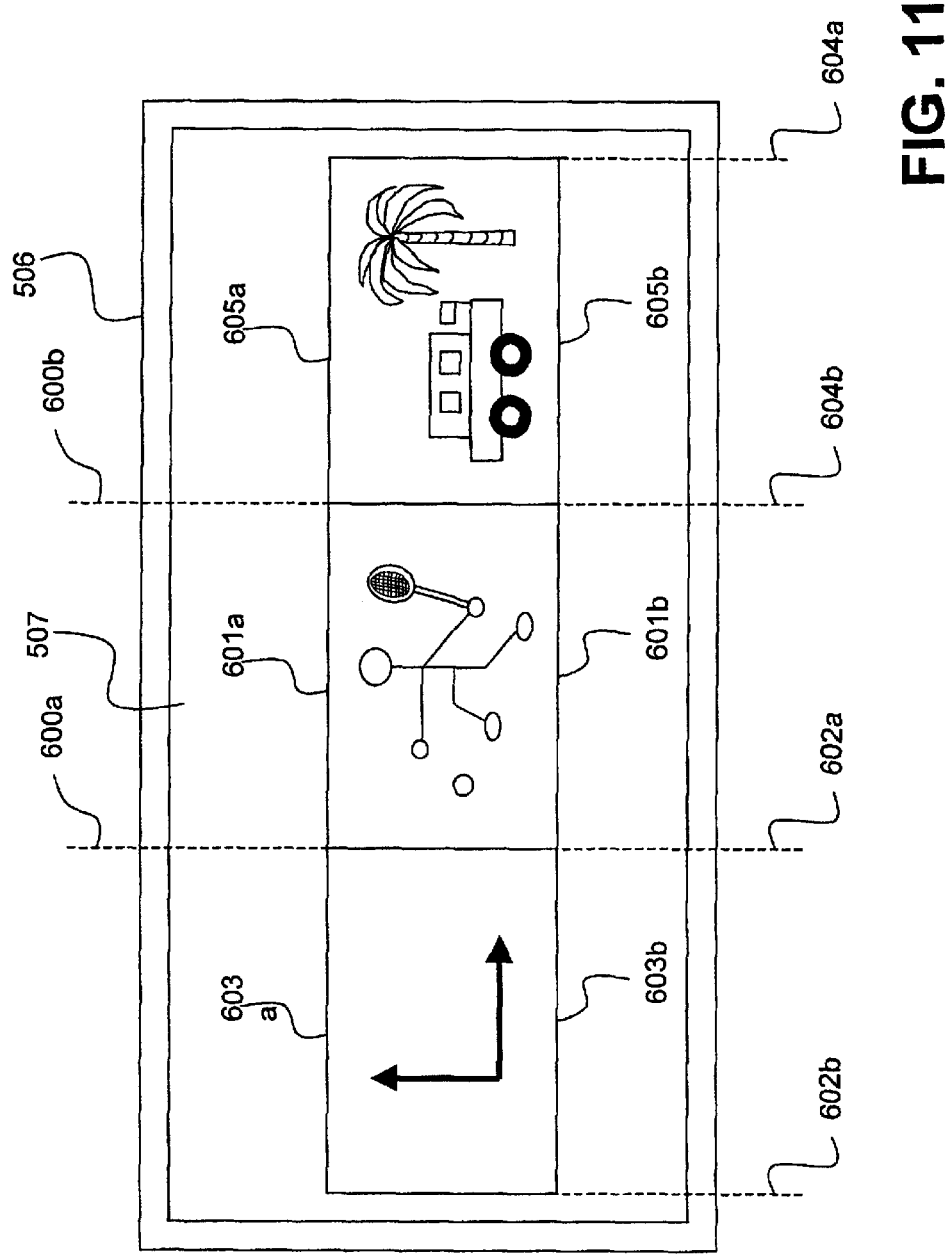
FIG. 11 is a front view of the transmissive/reflective mirror operating as a display for an integrated display system in an embodiment according to the present invention.

FIG. 11 is an illustration of an integrated image appearing on the mirror face 507 of the transmissive/reflective mirror 506. When the display areas 503 and 505 are at an angle, e.g., approximately 20 degrees, with respect to ground as shown in FIG. 9, left and right images of two arrows and of a vehicle and a tree, respectively, may appear to be at an angle with respect to a center image of a man playing tennis. User may perceive that all three of the images are equidistant from his eye point (location of his eyes) when the display areas 503 and 505 are angled appropriately. When the display areas 503 and 505 are parallel to ground, the user typically perceives that the three adjacent images are displayed on a flat screen.

In one embodiment, the left, center and right images may be overlapped at the adjacent edges as to generate an overlapped region between the left image and the center image and between the center image and the right image. Edge blending technology may be applied to the overlapped images to enhance the seamless appearance of the composite image generated by the three images. Examples of this projection technology is described in U.S. Pat. Nos. 4,974,073, 5,136,390 and 6,115,022, all of which have been incorporated by reference herein.

Figure 12:
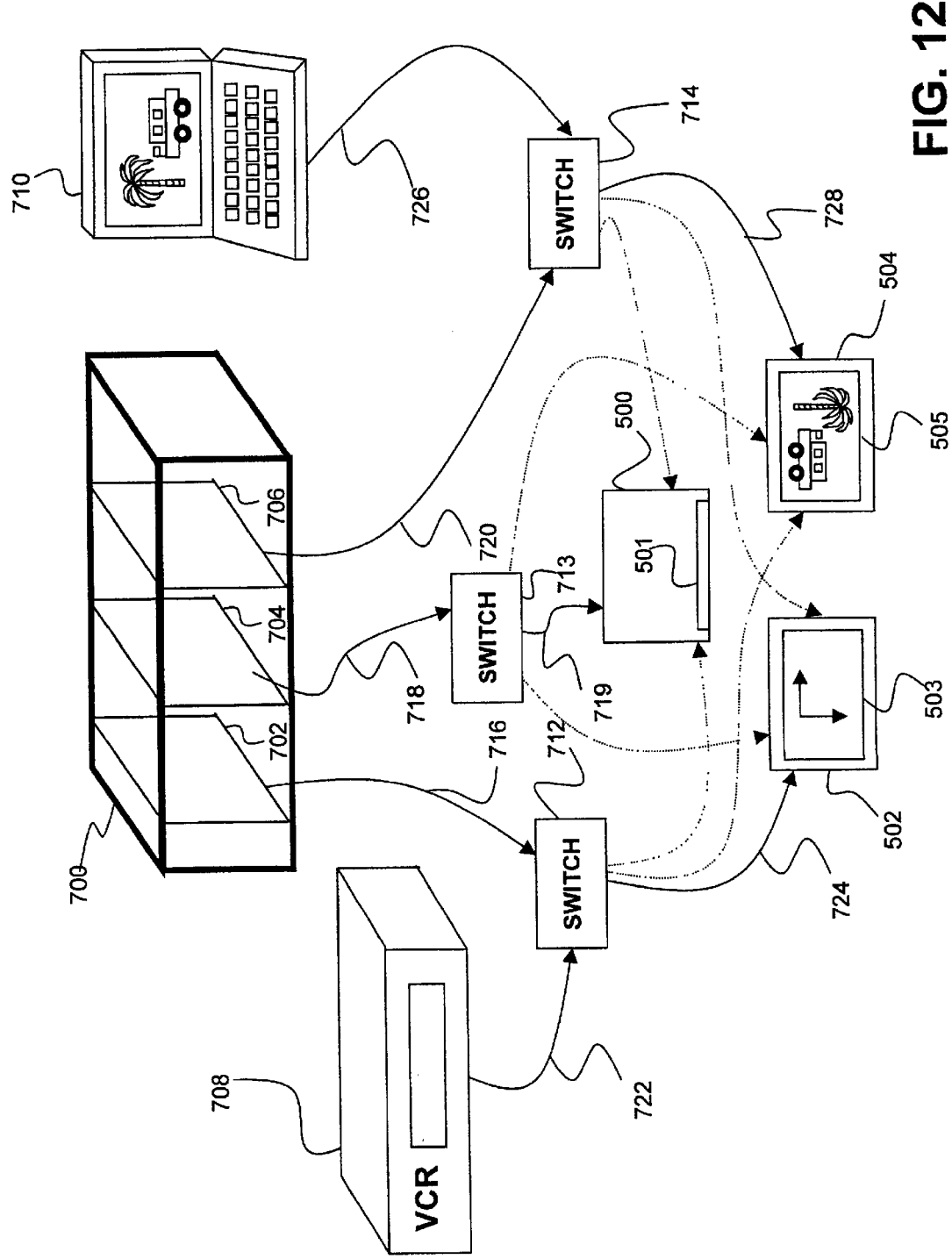
FIG. 12 is a system diagram that illustrates operation of the three monitors to display images from a multi-channel visual computer, a laptop and a video cassette recorder (VCR) in an embodiment according to the present invention.

FIG. 12 is an illustration that shows interfaces, in one embodiment of the present invention, between an integrated display system and devices that provide video and graphics to the integrated display system. The integrated display system preferably includes three monitors 500, 502 and 504 and a transmissive/reflective mirror (not shown). The three monitors 500, 502 and 504 preferably are flat screen CRT monitors. In other embodiments, the three monitors 500, 502 and 504 may be other conventional or non-conventional types of monitors including but not limited to: LCD, plasma display and/or DVI-compatible monitors.

A multi-channel visual computer 700 preferably includes three graphic interface cards 702, 704 and 706. The graphic interface cards 702, 704 and 706 preferably provides images 716, 718 and 720 to corresponding monitors 502, 500 and 504, respectively. The multi-channel visual computer 700 may be based on one or more of Unix, Mac-OS, Windows/NT, MS-DOS and Linux operating systems or any other conventional or non-conventional operating system.

The multi-channel visual computer 700 may provide graphics and/or video signals that represent the images 716, 718 and 720 to corresponding input for each of the three monitors 502, 500 and 504 including but not limited to: DVI, Firewire, or other direct digital formats, main and auxiliary RGB inputs, composite video inputs and S-video (Y/C) inputs among others.

In other embodiments, two or three separate computers may be used in place of the multi-channel visual computer 700 to provide graphics and/or video signals to the integrated display system. The images 716, 718 and 720 may be three unrelated images or each of the images may be a portion of a composite image. The graphic images 716, 718 and 720 may also be substantially identical to one another.

An additional image may be provided by a laptop 710 or any other computer or an electronic device capable of providing an image. The laptop 710 preferably provides an image 726 to the monitor 504 of the integrated display system. For example, the image 726 may include a picture of a vehicle and a tree.

Since the integrated display system in this embodiment is typically used to display three image segments, one on each array segment, when the laptop 710 provides the fourth image 726 in addition to the graphic images 716, 718 and 720 from the multi-channel visual computer 700, a switch 714 preferably is used to switch between one of the images from the multi-channel visual computer 700 and the image 726.

For example, the images 720 and 726 preferably are coupled to the switch 714. The switch 714 preferably multiplexes them to provide an image 728 to the monitor 504 of the integrated display system. The image 728 may be the image 720 or the image 726 based on the selection by the switch 714. The switch 714 may be manually controlled, e.g., through manipulation of a mechanical switch by the user. The switch 714 may also be electronic and controlled manually or controlled automatically, e.g., by a software running in the control unit (not shown). The switch 714 may also be used to provide the image 720 or the image 726 to one or both of the other two monitors 500 and 502 as indicated by dotted arrows on FIG. 12. In other embodiments, the switch 714 may also receive images from one or more other image sources to be selectively provided to one or more of the monitors 500, 502 and 504.

A video cassette recorder (VCR) 708 in one embodiment may provide a graphic image 722 to a switch 712, which preferably is similar to the switch 714. The image 716 from the multi-channel visual computer preferably is also coupled to the switch 712. The switch 712 preferably operates similarly to the switch 714 in that it selects between the images 716 and 722 to provide as an image 724 to the monitor 502 of the integrated display system. The switch 712 may also be used to provide the image 716 or the image 722 to one or both of the other two monitors 500 and 504 as indicated by dotted arrows on FIG. 12. In other embodiments, the switch 712 may also receive images from one or more other image sources to be selectively provided to one or more of the monitors 500, 502 and 504.

A switch 713, which preferably is similar to the switch 714, receives the image 718, and provides to the monitor 500 as an image 719. The switch 713 may also be used to provide the image 718 to one or both of the other two monitors 502 and 504 as indicated by dotted arrows on FIG. 12. In other embodiments, the switch 713 may be coupled to one or more other image sources to be selectively provided to one or more of the monitors 500, 502 and 504. In other embodiments, some of the image inputs may be provided to one or more monitors directly without going through a switch.

Figure 13:
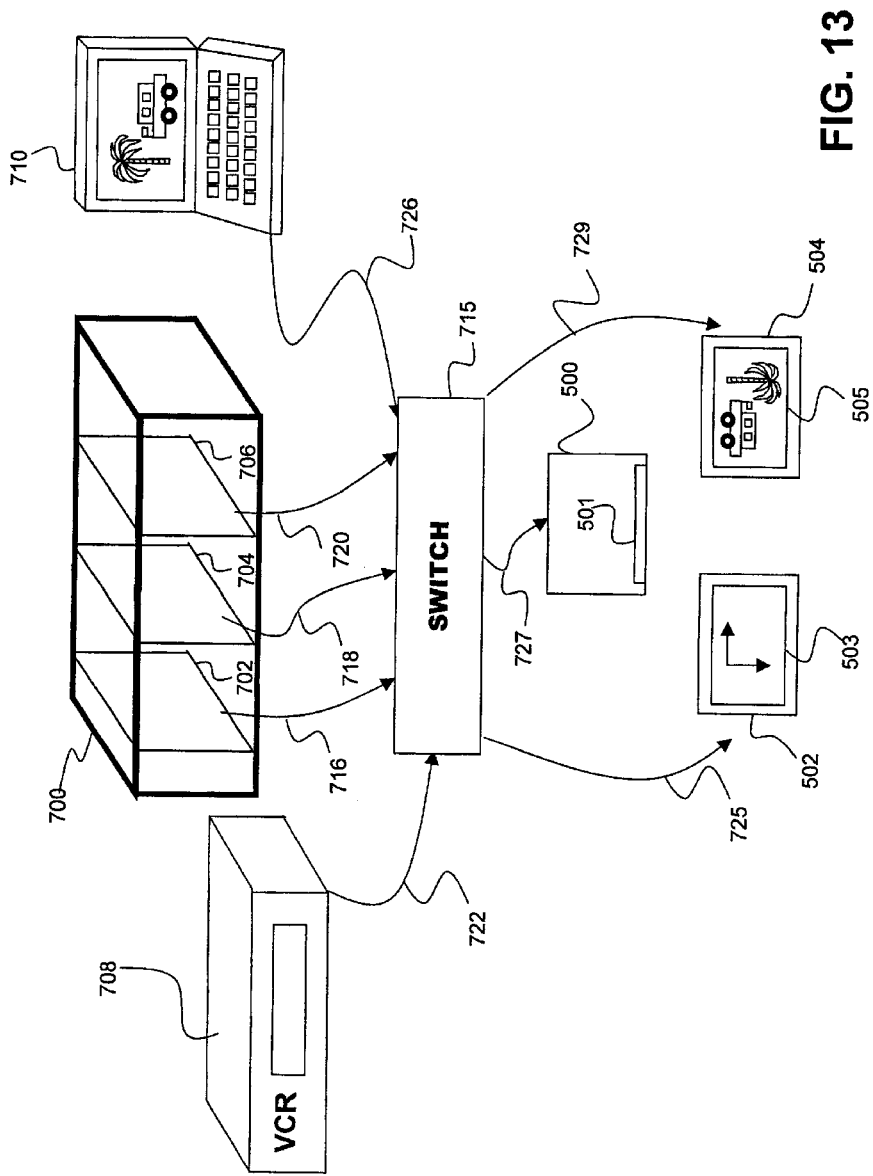
FIG. 13 is a system diagram that illustrates operation of the three monitors to display images from a multi-channel visual computer, laptop and a VCR using a matrix switcher in another embodiment according to the present invention.

FIG. 13 is a system diagram that illustrates operation of the three monitors 500, 502, 504 to display images from the multi-channel visual computer 700, the laptop 710 and the VCR 708 using a matrix switcher 715 in another embodiment according to the present invention. The configuration of the system of FIG. 13 is similar to that of the system in FIG. 12 except that a single matrix switcher is used instead of multiple switches. The matrix switcher may receive multiple inputs, and provide any of the inputs as any of multiple outputs.

The matrix switcher 715 may receive images 716, 718 and 720 from the multi-channel visual computer 700, the image 722 from the VCR 708 and/or the image 726 from the laptop 710. The matrix switcher 715 is capable of providing any of these image inputs as an image 725 to the monitor 502, as an image 727 to the monitor 500 and/or as an image 729 to the monitor 504. The matrix switcher 715 may also provide the identical image to any two or three of the monitors 500, 502 and 504. In other embodiments, the switcher 715 may receive image inputs from different number of image sources and/or provide outputs to different number of monitors/display devices.

FIG. 14A is a front view of a transmissive/reflective mirror 506 displaying three images 800a, 802a and 804a on a mirror face 507 in one embodiment of the present invention. The mirror face 507 displays the three images 800a, 802a and 804a as a composite image with virtually no seam or mullion between the images. In one embodiment, all three images that make up the composite image may be provided by the multi-channel visual computer 700 in FIG. 12. For example, the three images may be provided by the three graphic interface cards, 702, 704 and 706, respectively. In other embodiments, each of the three images may be provided by a different computer, multiple DVD players with prepared media, a multi-channel video server, an electronic device that takes a single image source and spreads it out to multiple channels or any other device capable of delivering the image to the screen.

FIG. 14B is a front view of the transmissive/reflective mirror 506 displaying three images 800b, 802b and 804b on the mirror face 507 in one embodiment of the present invention. The image 802b is substantially the same as the image 802a of FIG. 14A. The image 802b (or the image 802a) may be provided by the graphic interface card 704 shown in FIG. 12. The image 800b showing a couple of arrows, however, displays an image that is independent of the composite image. The image 800b, e.g., may be provided by the VCR 708 through the switch 712 shown in FIG. 12.

The image 804b also is independent of the composite image. For example, the image 804b may be that of a vehicle and a tree. The image 804b, e.g., may be provided by the laptop 710 through the switch 714 shown in FIG. 12. In other embodiments, the image 802b may also be independent of the composite image.

In one embodiment of the present invention, active matrix stereographics may be used with the integrated display system in order to create virtual reality (VR) and/or immersive visualization system by providing a realistic hologram type image (e.g., 3-D stereoscopic view) of the displayed objects on the composite image. For example, slightly different composite images are generated for the right and left eyes, respectively. The viewpoint preferably is slightly shifted right and left as it would be if an object is viewed first with one eye then another.

A synchronizing signal is sent to an infrared transmitter, which broadcasts an infrared synchronizing signal into the viewing area to be received by a pair of electronic shutter glasses with lenses including fast liquid crystal shutters. The synchronizing signal controls the glasses to alternately blank one eye then the other.

In other embodiments, the integrated display system may also include polarized glasses. polarization of light for the images transmitted through or reflected from the transmissive/reflective mirror is sequentially altered and resulting images are viewed by the user through the polarized glasses in order to see a 3-D stereoscopic view of objects displayed on the composite image.

Accordingly, the present invention provides an integrated display system for displaying a high-resolution composite image. Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by the appended claims and their equivalents rather than the foregoing description.

For example, in another embodiment, an integrated display system may include two monitors (left and right monitors) with display areas substantially normal to ground and facing a user, and one monitor (center monitor) with display area facing a generally upward direction. In this embodiment, the user typically views images from the display areas of the left and right monitors through a mirror face of a transmissive/reflective mirror while viewing the reflection of the image from the display area of the center monitor on the mirror face.

What is claimed is:

1. An integrated display system comprising:
   a first display having a first display area that faces a user;
   a second display having a second display area that faces a generally vertical direction; and
   a transmissive/reflective mirror having a mirror face between the first display and the user,
   wherein a first image from the first display at least partially passes through the mirror face towards the user, and a second image from the second display is at least partially reflected by the mirror face towards the user, so as to present a composite image comprising the first image and the second image to the user,
   wherein the first image partially overlaps with the second image to form the composite image which is larger than either one of the first and second images because a portion of the first and second images is not overlapped in the composite image, and
   wherein the first image is edge blended with the second image so that the composite image appears as an apparently seamless image.

2. The integrated display system according to claim 1, wherein the second display area faces a generally upward direction towards the transmissive/reflective mirror.

3. The integrated display system according to claim 1, wherein the second display area faces a generally downward direction towards the transmissive/reflective mirror.

4. The integrated display system according to claim 1, the the system further comprising a third display having a third display area that faces the user, wherein a third image from the third display at least partially passes through the mirror face towards the user, wherein the composite image further comprises the third image, and wherein the first and third display areas are on substantially the same plane, so that the composite image appears substantially flat.

5. The integrated display system according to claim 1, the the system further comprising a third display having a third display area that faces the user, wherein a third image from the third display at least partially passes through the mirror face towards the user, wherein the composite image further comprises the third image, and wherein the first and third display areas are oriented at an angle with respect to one another, so as to make the composite image appear to be on an angled display.

6. The integrated display system according to claim 5, wherein the first, second and third images appear to the user to be substantially equidistant from an eye point of the user.

7. The integrated display system according to claim 1, the the system further comprising a third display having a third display area that faces the user, wherein a third image from the third display at least partially passes through the mirror face towards the user, wherein the composite image further comprises the third image, and wherein the first and third display areas are oriented at an angle with respect to one another, so as to make the composite image appear to be on a curved screen.

8. The integrated display system according to claim 1, the the system further comprising a third display having a third display area that faces the generally vertical direction, wherein a third image from the third display is at least partially reflected by the mirror face towards the user, wherein the composite image further comprises the third image, and wherein the second and third display areas are on substantially the same plane, so that the composite image appears substantially flat.

9. The integrated display system according to claim 1, the the system further comprising a third display having the display area that faces a generally vertical direction, wherein a third image from the third display is at least partially reflected by the mirror face towards the user, wherein the composite image further comprises the third image, and wherein the second and third display areas are oriented at an angle with respect to one another, so as to make the composite image appear to be on an angled display.

10. The integrated display system according to claim 9, wherein the first, second and third images appear to the user to be substantially equidistant from the user.

11. The integrated display system according to claim 1, the the system further comprising a third display having a third display area that faces a generally vertical direction, wherein a third image from the third display is at least partially reflected by the mirror face towards the user, wherein the composite image further comprises the third image, and wherein the second and third display areas are oriented at an angle with respect to one another, so as to make the composite image appear to be on a curved screen.

12. The integrated display system according to claim 1, the the system further comprising distortion control circuitry, wherein the distortion control circuitry is used to modify the images in order to correct aberration due to mechanical or optical misalignment.

13. The integrated display system according to claim 1, the the system further comprising a pair of electronic shutter glasses to provide 3-D stereoscopic view of objects displayed on the composite image.

14. The integrated display system according to claim 13, wherein the pair of electronic shutter glasses comprises liquid crystal shutter lenses.

15. The integrated display system according to claim 1, the the system further comprising polarized glasses, wherein polarization of light for the images transmitted through or reflected from the transmissive/reflective mirror is sequentially altered and resulting images are viewed by the user through the polarized glasses in order to see 3-D stereoscopic view of objects displayed on the composite image.

16. The integrated display system according to claim 1, the further comprising a first image source for providing the first image to the first display and a second image source for providing the second image to the second display, wherein the composite image comprises a single continuous image.

17. The integrated display system according to claim 1, wherein at least one of the first and second displays is coupled to a plurality of image sources, and wherein the system further comprises a switch for switching between images from the image sources.

18. A method of generating a composite image using a transmissive/reflective mirror, the method comprising the steps of:
projecting a first image towards a user through the transmissive/reflective mirror; and
applying a second image at the transmissive/reflective mirror for the second image to be reflected towards the user,
wherein the images appear as a composite image to the user,
wherein the first image partially overlaps with the second image to form the composite image which is larger than either one of the first and second images because a portion of the first and second images is not overlapped in the composite image, and
wherein the first image is edge blended with the second image so that the composite image appears as an apparently seamless image.

19. The method according to claim 18, wherein the second image is applied at the transmissive/reflective mirror in a generally downward direction.

20. The method according to claim 18, wherein the second image is applied at the transmissive/reflective mirror in a generally upward direction.

21. The method according to claim 18, the method further comprising the step of:
projecting a third image towards the user through the transmissive/reflective mirror,
wherein the first, second and third images are applied such that the first, second and third images appear as a substantially flat composite image to the user.

22. The method according to claim 18, the method further comprising the step of:
projecting a third image towards the user through the transmissive/reflective mirror,
wherein the first, second and third images are applied such that the first, second and third images in the composite image appear to be oriented at an angle with respect to one another.

23. The method according to claim 22, wherein the first, second and third images appear to the user to be substantially equidistant from the user.

24. The method according to claim 18, the method further comprising the step of:
projecting a third image towards the user through the transmissive/reflective mirror,
wherein the first, second and third images are applied such that the first, second and third images in the composite image appear to the user to be on a curved screen.

25. The method according to claim 18, the method further comprising the step of:
applying a third image at the transmissive/reflective mirror for the third image to be reflected towards the user,
wherein the first, second and third images are applied such that the first, second and third images appear as a substantially flat composite image to the user.

26. The method according to claim 18, the method further comprising the step of:
applying a third image at the transmissive/reflective mirror for the third image to be reflected towards the user,
wherein the first, second and third images are applied such that the first, second and third images in the composite image appear to be oriented at an angle with respect to one another.

27. The method according to claim 22, wherein the first, second and third images appear to the user to be substantially equidistant from the user.

28. The method according to claim 18, the method further comprising the step of:
applying a third image at the transmissive/reflective mirror for the third image to be reflected towards the user,
wherein the first, second and third images are applied such that the first, second and third images in the composite image appear to the user to be on a curved screen.

29. The method according to claim 18, the method further comprising the step of performing distortion control to modify the images in order to correct aberration due to mechanical or optical misalignment.

30. The method according to claim 18, wherein the first and second images comprise 3-D stereoscopic view of objects when viewed using a pair of electronic shutter glasses.

31. The method according to claim 18, wherein polarization of light for the images transmitted through or reflected from the transmissive/reflective mirror is sequentially altered and resulting images are viewed by the user through polarized glasses in order to see 3-D stereoscopic view of objects displayed on the composite image.

32. An integrated display system comprising:
a first display having a first display area that faces a user;
a second display having a second display area that faces a generally vertical direction; and
a transmissive/reflective mirror having a mirror face between the first display and the user,
wherein a first image from the first display at least partially passes through the mirror face towards the user, and a second image from the second display is at least partially reflected by the mirror face towards the user, so as to present a composite image comprising the first image and the second image to the user, wherein the composite image is larger than either one of the first and second images, and
wherein the first display area and the second display area are oriented so as to make the composite image appear to be on an angled display.

33. The integrated display system according to claim 32, the the system further comprising a third display having a third display area that faces the user, wherein a third image from the third display at least partially passes through the mirror face toward the user, wherein the composite image further comprises the third image, and wherein the first and third display areas are oriented at an angle with respect to one another, so as to make the composite image appear to be on the angled display.

34. The integrated display system according to claim 32, the system further comprising a third display having a third display area that faces a generally vertical direction, wherein a third image from the third display is at least partially reflected by the mirror face toward the user, wherein the composite image further comprises the third image, and wherein the second and third display areas are oriented at an angle with respect to one another, so as to make the composite image appear to be on the angled display.

35. A method of generating a composite image using a transmissive/reflective mirror, the method comprising the steps of:
projecting a first image towards a user through the transmissive/reflective mirror; and applying a second image at the transmissive/reflective mirror for the second image to be reflected towards the user, wherein the images appear as a composite image, which is larger than either one of the first and second images, to the user, and wherein the first and second images are applied such that the first and second images in the composite image appear to be at an angle with respect to one another.

* * * * *

UNITED STATES PATENT AND TRADEMARK OFFICE
CERTIFICATE OF CORRECTION

PATENT NO. : 7,227,510 B2
APPLICATION NO. : 09/880516
DATED : June 5, 2007
INVENTOR(S) : Mayer, III et al.

It is certified that error appears in the above-identified patent and that said Letters Patent is hereby corrected as shown below:

In the Claims

| | |
|---|---|
| Column 11, line 60, Claim 4 | Delete "the the", Insert --the-- |
| Column 12, line 11, Claim 7 | Delete "the the", Insert --the-- |
| Column 12, line 20, Claim 8 | Delete "the the", Insert --the-- |
| Column 12, line 29, Claim 9 | Delete "the the", Insert --the-- |
| Column 12, line 42, Claim 11 | Delete "the the", Insert --the-- |
| Column 12, line 51, Claim 12 | Delete "the the", Insert --the-- |
| Column 12, line 56, Claim 13 | Delete "the the", Insert --the-- |
| Column 12, line 63, Claim 15 | Delete "the the", Insert --the-- |
| Column 12, line 70, Claim 16 | Delete "the the", Insert --the-- |

UNITED STATES PATENT AND TRADEMARK OFFICE
CERTIFICATE OF CORRECTION

PATENT NO. : 7,227,510 B2
APPLICATION NO. : 09/880516
DATED : June 5, 2007
INVENTOR(S) : Mayer, III et al.

It is certified that error appears in the above-identified patent and that said Letters Patent is hereby corrected as shown below:

Column 14, line 47, Claim 33    Delete "the the",
                                Insert --the--

Signed and Sealed this

Fourth Day of December, 2007

JON W. DUDAS
*Director of the United States Patent and Trademark Office*